(12) United States Patent
Myers et al.

(10) Patent No.: US 6,216,244 B1
(45) Date of Patent: Apr. 10, 2001

(54) POINT-TO-MULTIPOINT VARIABLE ANTENNA COMPENSATION SYSTEM

(75) Inventors: William K. Myers, McKinney; Douglas B. Weiner, The Colony, both of TX (US)

(73) Assignee: Cisco Systems, Inc., San Jose, CA (US)

( * ) Notice: Subject to any disclaimer, the term of this patent is extended or adjusted under 35 U.S.C. 154(b) by 0 days.

(21) Appl. No.: 09/167,804

(22) Filed: Oct. 7, 1998

(51) Int. Cl.⁷ .............................. G06F 11/00; G06F 11/30; G08C 25/00; H03M 13/00; H04L 1/00
(52) U.S. Cl. .................... 714/746; 714/752; 714/774; 455/63; 455/110; 455/562
(58) Field of Search .................................. 714/746, 752, 714/774; 455/63, 110, 562; 342/371, 372, 373

(56) References Cited

U.S. PATENT DOCUMENTS

| | | | |
|---|---|---|---|
| 4,672,387 | 6/1987 | Waddoup et al. | 343/781 P |
| 5,313,461 | 5/1994 | Ahl et al. | 370/94.2 |
| 5,448,753 | 9/1995 | Ahl et al. | 455/33.1 |
| 5,590,405 | 12/1996 | Daly et al. | 455/54.1 |
| 5,612,948 | 3/1997 | Fette et al. | 379/252 |
| 5,642,353 | 6/1997 | Roy, III et al. | 370/329 |
| 5,668,610 | 9/1997 | Bossard et al. | 348/723 |
| 5,701,583 | 12/1997 | Harbin et al. | 455/25 |
| 5,754,961 | 5/1998 | Serizawa et al. | 455/517 |
| 5,818,385 | 10/1998 | Bartholomew | 342/372 |
| 5,819,168 | 10/1998 | Golden et al. | 455/303 |

(List continued on next page.)

FOREIGN PATENT DOCUMENTS

| | | | |
|---|---|---|---|
| 0 651 531 A2 | 5/1995 | (EP) | H04L/1/12 |
| 0 715 478 A2 | 6/1996 | (EP) | H04Q/7/36 |
| WO 90/03071 | 3/1990 | (WO) | H04B/7/26 |
| WO 96/38786 | 12/1996 | (WO) | G06F/9/46 |
| WO 97/29608 | 8/1997 | (WO) | H04Q/7/36 |
| WO 98/42150 | 9/1998 | (WO) | H04Q/7/00 |

OTHER PUBLICATIONS

PCT International Search Report in International Application No. PCT/US 99/25657, dated Jun. 13, 2000, 7 pages.
Aikawa, Motoyama, Umehira, "Forward error correction schemes for wireless ATM Systems", 1996 IEEE International Conference on Communications, vol. 1, pp 454–458, Jun. 23–27, 1996.
Cho, Nishimori, Hori, "Adaptive base station antenna configuration for street microcells considering propagation environment", 1997 IEEE Antennas and Propagation Society International Symposium, vol. 1, pp 346–349, Jul. 13–18, 1997.

Primary Examiner—Albert Decady
Assistant Examiner—Samuel Lin
(74) Attorney, Agent, or Firm—Baker Botts L.L.P.

(57) ABSTRACT

An antenna compensation system and method equalizes transmission link efficiency in sectors having unequal antenna or path gain while maintaining an equalized power spectral density. Areas of a sector having lower gains receive broadcasts with more robust coding to equalize their transmission link performance with areas of a sector having higher gains. The robustness of coding is controlled through setting of different forward error code rates, setting of different modulation types, or a combination of both. In analog systems it is controlled through variation of a signal-to-noise sensitive transmission parameter. Sectors may be divided azimuthally with areas at or near the boresight receiving less robust coding and areas nearer the sector edges receiving more robust coding. Similarly, sectors may be divided into radial areas with the more distant areas receiving more robust coding.

16 Claims, 2 Drawing Sheets

U.S. PATENT DOCUMENTS

| | | | |
|---|---|---|---|
| 5,867,763 | 2/1999 | Dean et al. | 455/5.1 |
| 5,966,094 | 10/1999 | Ward et al. | 342/373 |
| 5,973,638 | 10/1999 | Robbins et al. | 342/172 |
| 6,006,069 | 12/1999 | Langston | 455/62 |
| 6,006,110 * | 12/1999 | Raleigh | 455/561 |
| 6,021,158 * | 2/2000 | Schurr et al. | 375/211 |
| 6,072,437 * | 6/2000 | Zimmerman et al. | 343/753 |

* cited by examiner

POINT-TO-MULTIPOINT VARIABLE ANTENNA COMPENSATION SYSTEM

FIELD OF THE INVENTION

The present invention generally concerns point-to-multipoint wireless communication systems. More particularly, the present invention concerns a point-to-multipoint wireless communication system having one or more antennas providing partial or omnidirectional coverage. The antennas may be sectored so that each achieves its coverage through plural sectors each covering limited azimuth angles.

BACKGROUND OF THE INVENTION

Point-to-multipoint localized distribution systems are known in the art. Typical systems use multiple low power node antennas, also commonly referred to as cell stations, base stations, and hub stations, which deliver wireless communication services to receiving stations in an area of coverage, e.g., "cell", defined around the node antennas. The node antennas are arranged to form partially overlapping cells. Frequency differentiation, polarization differentiation and similar techniques are used alone or in combination to prevent conflicting signals from adversely affecting communications received by receiving stations at or near areas of overlap between adjacent node antennas and between adjacent sectors of a particular node antenna.

An interesting point-to-multipoint microwave television distribution system utilizes devices in the millimeter wave frequency band, between about 28 GHz and 300 GHz. Of particular interest is the 29 GHz band, from 27.5 to 31.3 GHz, which provides sufficient width to accommodate a number of broadband channels, avoids previously allocated terrestrial bands, avoids satellite down-link bands, permits relatively small sized antennas, and is compatible with known low-cost microwave circuit fabrication techniques.

Each antenna in such a system, or in a similar communication system, is required to provide omnidirectional coverage to form the generally circular cell of transmission coverage around itself. Individual antennas are usually sectored, so that the omnidirectional coverage is achieved by individual directional sector antennas that cover limited azimuth angles. As an example, four sector antennas covering adjacent 90 degree sectors may be combined to form an omnidirectional coverage node antenna.

A disadvantage with typical node sector antennas is their nonuniform gain. Their gain commonly varies as a function of azimuth across the sector and/or as a function of radial distance away from the antenna. Gain is largest near the center of the sector, an area known as the boresight, and gradually lessens at azimuth angles approaching the edges of the sector. As a result, stations disposed in the boresight receive stronger signals than those disposed at azimuth angles approaching the edges of the sector. Similarly, stations disposed at different radial distances see different antenna gain and different path loss. The stations receiving the lower power signals are susceptible to signal outage during fading propagation conditions which are associated, for example, with heavy rainfall. In addition, their signal to noise ratio is diminished, producing a higher potential for other types of signal interference. Other systems use radial antennas, or other types of antennas and share similar problems with receiving stations near adjacent sectors and with receiving stations at different radial distances in the area of antenna coverage.

To compensate for differences in antenna and path gain, prior compensation techniques have varied the power supplied to a specific station. This method works well for terrestrial or satellite point-to-point communication systems where frequency reuse is not locally required and where antennas are separated by large distances. In contrast, it is important to equalize the power spectral density at receiver stations in a point-to-multipoint system so that interference from other node sectors is avoided. For example, when frequency reuse is employed between node sectors, more than one receiving station is on the same frequency at the node, and the level of sector-to-sector interference is increased by having one signal power density higher than the others that share common frequencies.

Thus, there is a need for an improved antenna compensation system for a point-to-multipoint system which addresses the aforementioned difficulties. More specifically, there is a need for an improved antenna compensation system for a point-to-multipoint system which accounts for variable gain across the azimuth range defining a sector while maintaining equalized power spectral density. Because performance may also vary as a function of radial distance from a node antenna, there is a similar need for an improved antenna compensation system for a point-to-multipoint system which accounts for variable gain across radial distance while maintaining the equalized power spectral density.

Accordingly, it is a primary object of the present invention to provide an improved antenna compensation system having a compensated antenna gain pattern and an equalized power spectral density.

Another object is to provide an improved antenna compensation system utilizing multiple forward error correction code rates to compensate for antenna sector pattern gain differences in azimuth so that receiver stations disposed near sector edges have performance equal to that of receiver stations disposed in sector boresights.

Yet another object is to provide an improved antenna compensation system utilizing multiple modulation types having different signal transmission efficiencies to compensate for antenna sector pattern gain differences in azimuth so that receiver stations disposed near sector edges have performance equal to that of receiver stations disposed in sector boresights.

Still another object is to provide an improved antenna compensation system utilizing a combination of multiple forward error correction code rates and multiple modulation types having different signal transmission efficiencies to compensate for antenna sector pattern gain differences in azimuth so that receiver stations disposed near sector edges have performance equal to that of receiver stations disposed in boresights.

An additional object is to provide an improved antenna compensation system individually or severally utilizing variable modulation forward error correction code rates and variable modulation types having different signal transmission efficiencies to compensate for antenna pattern gain differences in radial distance so that receiver stations disposed in radial areas close to the antenna have performance equal to that of receiver stations disposed in radial areas further from the antenna.

A further object of the present invention is to provide an improved analog antenna compensation system in which a signal-to-noise sensitive transmission parameter is varied to compensate for antenna sector pattern gain differences in azimuth and/or antenna pattern gain differences in radial distance to equalize receiver station performance.

SUMMARY OF THE INVENTION

These and other objects are met or exceeded by the present antenna compensation system which equalizes link performance for any equidistant receiver station over each complete node sector azimuth range. Performance gain is realized outside the boresight through more robust transmission to equalize the performance gain throughout an entire sector azimuth range. Robustness varies in inverse proportion to antenna or path gain. A preferred embodiment varies error correction robustness and/or modulation type robustness. Thus, where gain is the highest, e.g. at the boresight, less robust FEC (forward error correction code) or modulation types are used, and where gain falls off, more robust FEC or modulation types are used. Robustness may be similarly varied in analog modulation systems in which a signal-to-noise sensitive transmission parameter may be varied.

A preferred digital antenna compensation system uses a convolution FEC rate ⅞ at the boresight. Successive higher performance rates of ¾ and ½ are used between the boresight and respective edges of the sector. Similarly, a lower eight phase shift key (8PSK) or M-QAM might be used at the boresight and the higher performing quadrature phase shift key modulation type away from the boresight. The result is an equalization of signal performance across the sector. Compensation may also be similarly utilized to equalize performance for gain which varies according to radial distance.

BRIEF DESCRIPTION OF THE DRAWINGS

Other objects, features and advantages of the invention will become apparent to artisans upon reading the following detailed description, while referring to the attached drawings, in which.

DETAILED DESCRIPTION OF THE INVENTION

Broadly stated, the present invention is directed to an antenna compensation system for equalizing antenna gain azimuthally and/or radially so that an equalized link performance is achieved at receiver stations in various different azimuth and/or radial locations. In a preferred embodiment, variable rate forward error code correction and/or variable modulation types are used with the most efficient correction and modulation being applied in sector areas where antenna gain is the lowest. Link performance is equalized with an equalized power spectral density, thereby permitting 100% frequency reuse. The invention is also applicable to analog transmission antennas in which a signal-to-noise sensitive transmission parameter may be varied.

Figure 1:
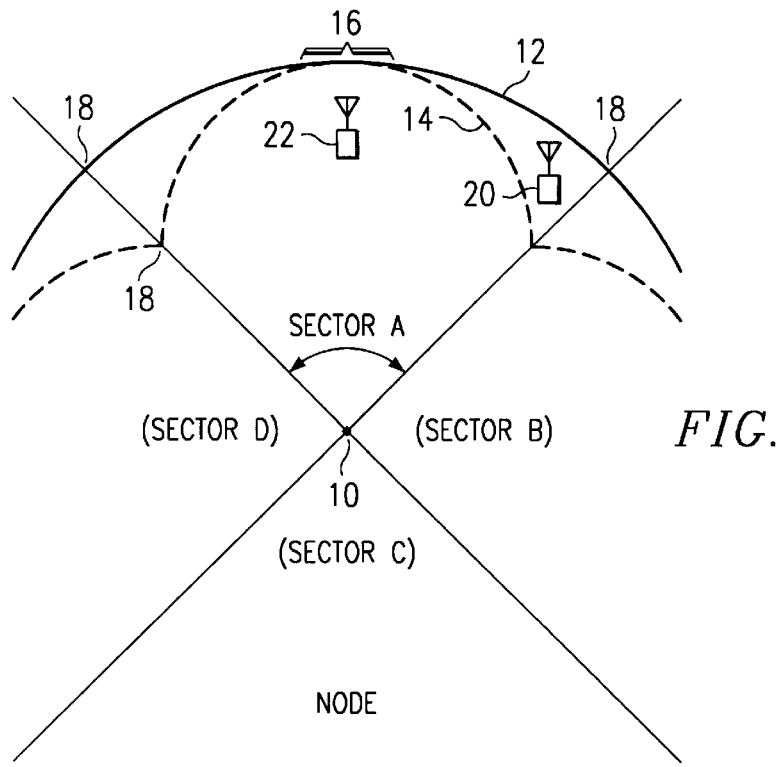
FIG. 1 compares typical sector gain compared to an equalized gain achievable through the present invention.

Turning now to the drawings, and particularly FIG. 1, there is shown a schematic representation of a compensated sectored node antenna 10 that produces a generally equalized gain 12 azimuthally across sector A. Though various size sectors are possible, the antenna 10 uses a typical pattern of four 90° sectors A–D to achieve omnidirectional, e.g. 360°, coverage. The power spectral density of the antenna 10 is equal throughout the sectors. Gain in sectors B–D is equalized in a similar fashion to that illustrated with respect to sector A. The equalized gain 12 remains generally constant through the complete range of azimuth angles in each of the sectors, whereas uncorrected gain 14 is greatest at the boresight 16 and rolls off near the edges 18 of the sector. Because gain is equalized throughout azimuth angles of the sectors, a receiver station 20 near the sector edge 18 achieves a similar link performance to a receiver station 22 which is radially equidistant from the node antenna 10, but within the boresight 16.

Figure 2:
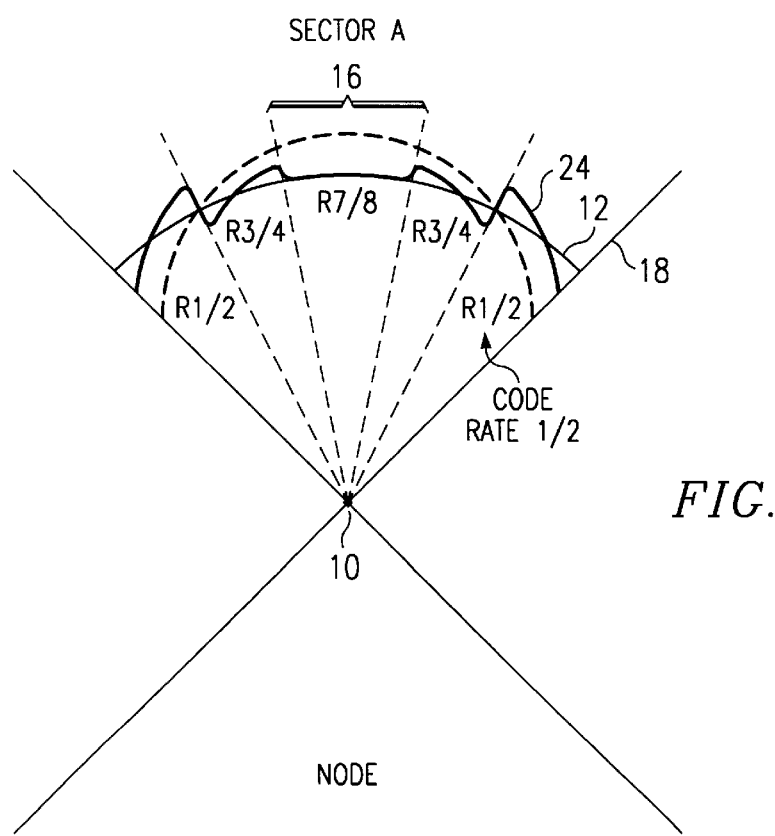
FIG. 2 schematically illustrates a preferred multiple forward error code rate pattern to compensate for gain which varies by azimuth angle across a sector.

Referring now to FIG. 2, the compensated equalized gain 12 is seen to be preferably achieved by the use of multiple forward error correction code (FEC) code rates R. The particular illustrated embodiment utilizes three different code rates. Two rates produce a rougher equalization, but may be used according to the present invention. Similarly, a smoother equalization may be achieved by use of more than three code rates. As seen in FIG. 2, sector A is divided into 5 areas, with the most robust rate R½ used in the two areas adjacent the sector edges, and the least robust R⅞ in the boresight 16. The actual sawtooth gain 24 is calculated to approximate the smooth ideal gain 12 to within about 1 dB. Thus, the embodiment illustrated in FIGS. 1 and 2 provides a method of providing equalized link performance while maintaining an equalized power spectral density through setting the FEC code rate to be different in different areas of the sector. Multiple FEC rates are illustrated in FIG. 2, but use of different efficiency modulation types can also achieve the generally uniform gain across full sector azimuth range.

Digital communication link performance may be described by the signal to noise ratio required to provide a given bit error rate. The signal to noise ratio is described in terms of Eb/No where Eb is the signal energy per bit of data transmitted and No is the noise spectral density. Lower Eb/No values for a given bit error rate, such as $10^{-6}$, allow better link performance. Where a lower Eb/No meets system bit error rate performance, less power is required at the receiver; whereas higher Eb/No requires more power at the receiver.

This concept is used to the advantage of optimizing the number of channels transmitted in a given allocation of frequency spectrum. The performance for subscribers at different azimuth locations and different radial distances from the antenna is optimized. Geographic orientation to the antenna is used to determine subscriber modulation.

A comparison of modulation Eb/No performance (theoretical) for a few FEC code rates and for multiple Phase Shift Key (PSK) modulation types is described in Table 1.

TABLE 1

| FEC and Modulation | Eb/No Performance for $10^{-6}$ bit error rate | Relative Performance referred to Rate ¾ QPSK |
|---|---|---|
| Rate ½ QPSK | 5.0 dB | +1.0 dB |
| Rate ¾ QPSK | 6.0 dB | 0 dB |
| Rate ⅞ QPSK | 7.0 dB | −1.0 dB |
| Rate ⅔ 8PSK | 7.3 dB | −1.3 dB |

As shown in FIG. 2, where antenna gains are lowest at the edge of a sector 18, a Rate ½ QPSK system could be used to achieve compensation. At the boresight 16, where antenna gains are highest, the lower performing rate ⅔ with 8PSK or M-QAM modulation could be selected. A rate ¾ reference code rate was used for comparison. The modulation and code rates are divided up to match the subscriber location in the node azimuth antenna pattern, and for near or far radial distance from the node antenna 10.

An example of a particular azimuth variable antenna compensation pattern according to the invention is described in Table 2 along with the relative performance (theoretical) of various modulation types.

TABLE 2

| Azimuth of Node Antenna | Modulation Type/FEC | Antenna Gain vs Azimuth | Relative FEC Gain | Net Performance |
|---|---|---|---|---|
| ±45 degrees | R1/2 QPSK | 10 dB | +1.0 dB | 11.0 dB |
| ±35 degrees | R¾ QPSK | 12 dB | 0 dB | 12.0 dB |
| ±25 degrees | R⅞ QPSK | 13 dB | −1.0 dB | 12.0 dB |
| 0 degrees | R⅔ 8PSK | 15 dB | −1.3 dB | 13.7 dB |

As seen in Table 2, a 5 dB difference in antenna gain has been compensated to a 2.7 dB difference in net link performance.

Rate ½ convolution code requires a higher (2×) symbol rate than with no FEC and therefore requires a greater bandwidth at a given data rate for transmission. Rate ¾ code requires 1.33 higher bandwidth than with no FEC. To provide an equalized power spectral density for all modulations, the power must be adjusted according to the code rate and modulation type. It is common to increase modulator output power level with conventional gain control hardware such as attenuators, which may also be software controlled prior to combining. To equalize the Power Spectral Density (PSD), the transmitted power increases with wider bandwidth modulation codes. Higher power on some configurations further enhances the difference in the antenna gain pattern. Table 3 shows the theoretical increase in power for code rate performance and for constant power spectral density. Rate ¾ code is again used for a reference.

TABLE 3

| Modulation Type/FEC | Relative FEC Gain | Relative Power for Constant PSD | Net Code Performance | Performance with Antenna Gain |
|---|---|---|---|---|
| R½ QPSK | +1.0 dB | +1.8 dB | +2.8 dB | 12.8 dB |
| R¾ QPSK | 0 dB | 0 dB | 0 dB | 12.5 dB |
| R⅞ QPSK | −1.0 dB | −0.7 dB | −1.7 dB | 13.3 dB |
| R⅔ 8PSK | −1.3 dB | −1.3 dB | −2.6 dB | — |

The 5 dB antenna roll off described in Table 2 can be compensated by 4.4 dB, to within 0.5 dB, through the use of Rate ½, ¾, and ⅞ FEC rates, with QPSK. In Table 3, the pattern is divided into 3 segments for compensation in place of 4 as was done in Table 2.

Figure 3:
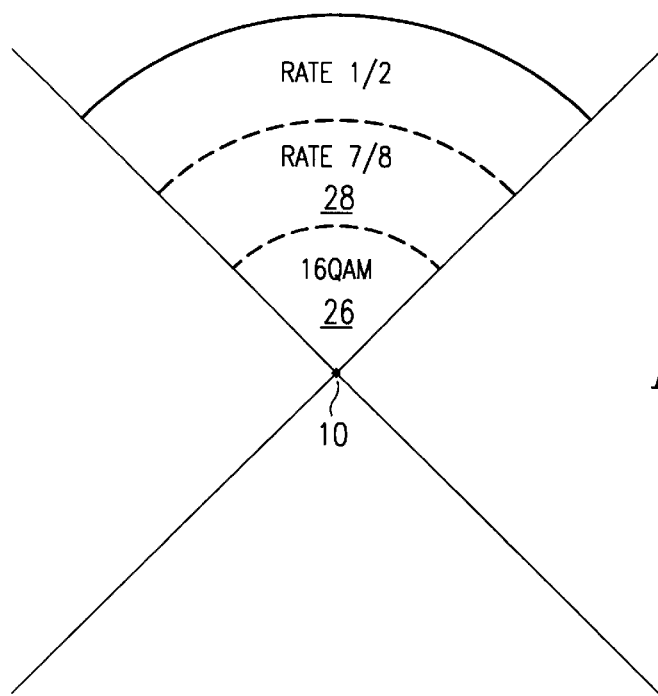
FIG. 3 schematically illustrates a preferred multiple forward error code and multiple modulation type pattern to compensate for gain which varies by radial distance from an antenna.

Radial variation may also be compensated through the present invention, as illustrated in FIG. 3. As seen in FIG. 3, radial sector areas 26, 28 closer to the node antenna 10 receive less robust coding compensation. Coding compensation in FIG. 3 is achieved through setting of different code rates/modulation types and includes 8PSK modulation. Power spectral density is similarly equalized here in radial increments.

Figure 4:
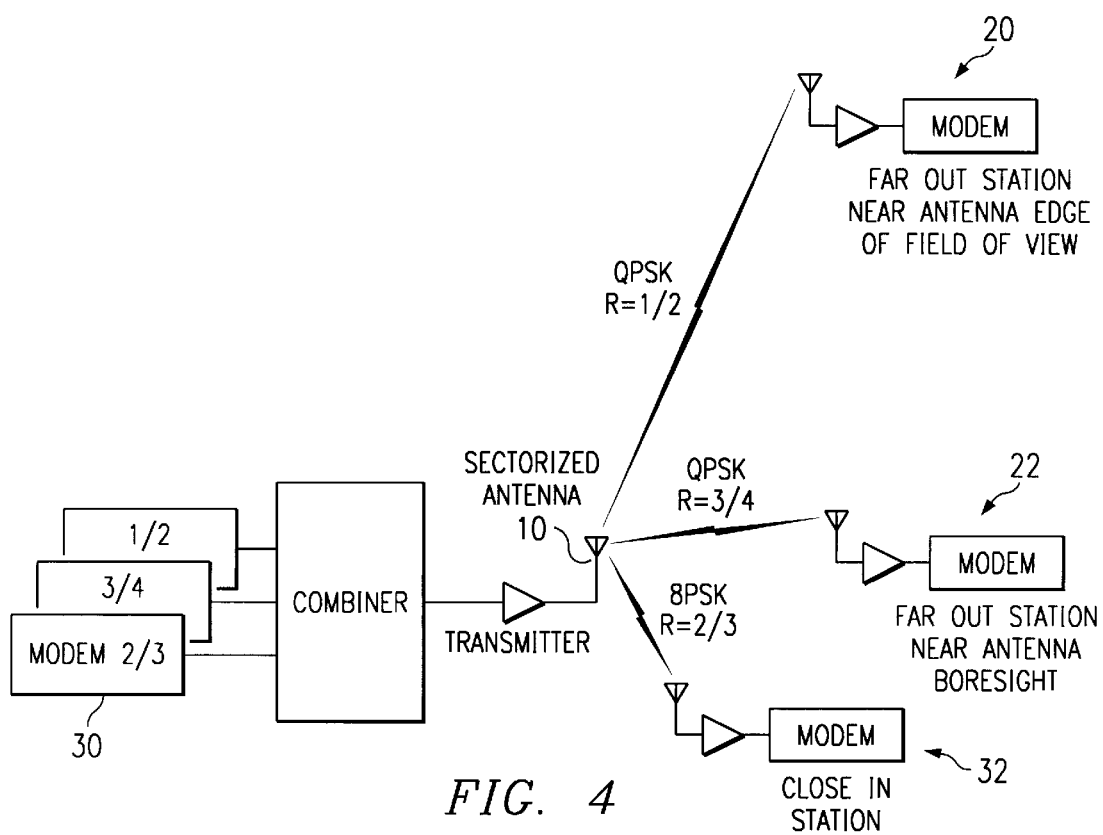
FIG. 4 is a schematic representation of a preferred compensated point-to-multipoint cellular communication system.

The compensation of the invention is physically realized through modulator control. A specific example is provided in FIG. 4, where separate modems 30 are used to generate respective ½, ⅔ and ¾ rates for compensation to receiving stations 20, 22 at different azimuth locations (22 in boresight, 20 near edge) and for stations 32, 20 or 22 at different radial distances (32 close in, and 22 far out). Other sectors or patterns are compensated in similar fashion according to the invention using conventional combiners, transmitters and antennas.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. An antenna compensation system comprising:
   at least one antenna having at least one transmission sector, the transmission sector being divided into a plurality of azimuth areas and a plurality of radial areas;
   a transmitter for said at least one antenna for transmitting information through said at least one antenna to the plurality of azimuth and radial areas in its transmission sector with equalized power spectral density throughout each of said azimuth and radial areas of said transmission sector; and
   an equalizer for equalizing transmission link efficiency of at least two of said azimuth and/or radial areas of said transmission sector having different gains while maintaining said equalized power spectral density throughout said transmission sector.

2. The system as defined in claim 1, wherein said equalizer equalizes transmission link efficiency in said at least two of said azimuth and/or radial areas by setting different forward error correction code rates in said at least two of said azimuth and/or radial areas.

3. The system as defined in claim 2, wherein said at least two of said azimuth and/or radial areas comprise separate azimuth ranges in said transmission sector and said equalizer sets a more robust forward error correction code rate in the azimuth range having a lower gain.

4. The system as defined in claim 2, wherein said at least two of said azimuth and/or radial areas comprise a boresight of said transmission sector and an edge of said transmission sector, and said equalizer sets a more robust forward error correction code rate in the edge of said transmission sector than in the boresight of said transmission sector.

5. The system as defined in claim 2, wherein three forward error correction code rates are used in five separate azimuth areas in said transmission sector.

6. The system as defined in claim 5, wherein a first two of said five azimuth areas are adjacent edges of said transmission sector, a third one of said five azimuth areas is in a boresight of said transmission sector and the remaining two of said five azimuth areas are between the boresight and the edges of the transmission sector.

7. The system as defined in claim 6, wherein said equalizer sets a forward error correction code rate of ½ in said first two of said five azimuth areas, a forward error correction code rate of ⅞ in the third one of said five azimuth areas, and a forward error correction code rate of ¾ in the remaining two of said five azimuth areas.

8. The system as defined in claim 2, wherein said equalizer further sets different modulation types in at least two of said azimuth and/or radial areas.

9. The system as defined in claim 2, wherein said at least two of said azimuth and/or radial areas comprise separate radial areas in said transmission sector and said equalizer sets a more robust forward error correction code rate in the radial area which is more distant from said at least one antenna.

10. A method for compensating link efficiency in a point-to-multipoint antenna system having at least one transmission sector with a variable gain, the method comprising:

dividing the transmission sector into at least two separate transmission areas according to gain being different in two separate transmission areas;

transmitting signals in said two separate transmission areas with coding of two different efficiencies to equalize link performance in said two separate transmission areas while equalizing the power spectral density in said two separate transmission areas.

11. The method according to claim 10, wherein said two different efficiencies are accomplished through two different forward error correction code rates.

12. The method according to claim 11, wherein one of said two separate transmission areas is in a boresight of the transmission sector and the other of said two separate transmission areas is outside the boresight, and signals are transmitted in said one of said two separate transmission areas with a less robust forward error correction code rate than in the other of said two separate transmission areas.

13. The method according to claim 11, wherein one of said two separate transmission areas comprises a radial area that separates the other of said two separate transmission areas from a broadcast point for the transmission sector, and signals are transmitted in said one of said two separate transmission areas with a less robust forward error correction code rate than in the other of said two separate transmission areas.

14. The method according to claim 10, wherein said two different efficiencies are accomplished through two different signal modulation types.

15. The method according to claim 14, wherein one of said two separate transmission areas is in the boresight of the transmission sector and the other of said two separate transmission areas is outside the boresight, and signals are transmitted in said one of said two separate transmission areas with a less robust signal modulation type than in the other of said two separate transmission areas.

16. The method for equalizing transmission link efficiency according to claim 14, wherein one of said two separate transmission areas comprises a radial area that separates the other of said two separate transmission areas from a broadcast point for the transmission sector, and signals are transmitted in said one of said two separate transmission areas with a less robust signal modulation type than in the other of said two separate transmission areas.

* * * * *